United States Patent [19]

Farkye et al.

[11] Patent Number: 5,445,845
[45] Date of Patent: Aug. 29, 1995

[54] CHEESE MAKING PROCESS

[75] Inventors: Nana Y. Farkye, Atascadero; B. Bhanu Prasad, San Luis Obispo, both of Calif.

[73] Assignee: California Polytechnic State University Foundation, San Luis Obispo, Calif.

[21] Appl. No.: 152,457

[22] Filed: Nov. 12, 1993

[51] Int. Cl.$^6$ .............................................. A23C 19/00
[52] U.S. Cl. ........................................ 426/582; 426/39
[58] Field of Search ..................... 426/36, 39, 40, 582

[56] References Cited

U.S. PATENT DOCUMENTS

| | | | |
|---|---|---|---|
| 3,316,098 | 4/1967 | Noznick et al. | 426/582 |
| 3,882,250 | 5/1975 | Loter et al. | 426/39 |
| 3,953,610 | 4/1976 | Little | 426/39 |
| 4,066,800 | 1/1978 | Rosenau et al. | 426/582 |
| 4,352,826 | 10/1982 | Pearline et al. | 426/582 |
| 4,374,152 | 2/1983 | Loter | 426/582 |
| 4,534,982 | 8/1985 | Yoshida et al. | 426/39 |
| 4,766,003 | 8/1988 | Skovhauge et al. | 426/582 |
| 4,851,237 | 7/1989 | Bussiere et al. | 426/39 |
| 4,957,751 | 9/1990 | Lehmann et al. | 426/39 |
| 4,959,229 | 9/1990 | Reddy et al. | 426/39 |
| 5,009,914 | 4/1991 | Serpelloni | 426/582 |
| 5,130,148 | 7/1992 | Brown et al. | 426/40 |

OTHER PUBLICATIONS

Hill, A. R., et al., "Manufacturing Parameters of Queso Blanco Made from Milk amd Recombined Milk", *Canadian Institute of Food Science and Technology Journal*, vol. 15, No. 1, pp. 47–53 (1982).

Kosikowski, F. V., *Cheese and Fermented Milk Foods*, pp. 173–176 (1982).

Parnell-Clunies, E. M., "Heat Treatment and Homogenization of Milk for Queso Blanco (Latin American White Cheese) Manufacture", *Canadian Institute of Food Science and Technology Journal*, vol. 18, No. 2, pp. 133–136 (1985).

Siapantas, L. A., et al., "Acetic acid preparation phenomenon of whole milk for Queso Blanco cheeese", *Journal of Dairy Science*, vol. 48, p. 764 (1965).

*Primary Examiner*—George Yeung
*Attorney, Agent, or Firm*—Gerstman, Ellis & McMillin, Ltd.

[57] ABSTRACT

A process for making cheese including the addition of calcium chloride to milk, heating the milk slowly to about 85° C., holding the milk at 85° C. for about 30 minutes, adding hot food-grade organic acid to the milk to reduce pH to about 4.4 to form a curd, removing the whey and cooling curd rapidly to about 8° C. The process lends to making Queso Blanco (white cheese).

5 Claims, No Drawings

CHEESE MAKING PROCESS

FIELD OF THE INVENTION

The present invention concerns a novel process for the production of cheeses, particularly, Queso Blanco (white cheese).

BACKGROUND OF THE INVENTION

Queso Blanco (white cheese) is the generic name for many fresh, white semi-soft cheeses produced in several parts of Latin America. The cheeses differ from each other by method of production (i.e., coagulation by acid/heat or rennet). Examples include Queso de Cincho, Queso del Pais and Queso Llanero. In other parts of the world, similar cheeses include Chhana and Paneer in India, Armavir in Western Caucasus, Zsirpi in the Himalayas and Beli sir types in the Balkans.

An object of the present invention is to provide a new method involving acid/heat coagulation for making a mild acid, semisoft cheese of the Queso Blanco type with conventional dairy equipment. Advantages of the process can include high yield, enhanced whey separation, a more cohesive curd with excellent functional properties and extended shelf life. Typical composition of the cheese is 51-53% moisture, 19-20% fat, 20-22% protein, and a pH of about 5.2-5.3.

Another object of the present invention is to provide a cheese which has unique functional properties which makes it suitable for use as an ingredient in a variety of foods. The conditions of manufacture limit the growth of pathogenic organisms. The cheese has long refrigerated shelf-life and excellent melt resistance. The cheese can withstand processing conditions such as deep frying, cooking, microwave heating, baking, etc., without oiling off or deformation (melting).

Some of the food applications include use in curry (stews), soups and casseroles. It can be used as a filling in ravioli and other pasta products. It can be mixed with cereals and extruded as a puffed nutritious snack food. It can be used to replace tofu in oriental dishes. It can be diced and added to microwaveable instant noodles to enhance their nutritional value. The good sliceability of the cheese makes it well-suited for use in salads.

Other objects and advantages of the present invention will become apparent as the description proceeds.

SUMMARY OF THE INVENTION

In accordance with the present invention, a process is provided which includes adding calcium chloride (CaCl$_2$) to milk, heating milk slowly to about 85° C., holding at about 85° C. for about 30 minutes, adding hot food-grade organic acid to reduce the pH to about 4.4 to form a curd, removing the whey and cooling the curd rapidly to about 8° C.

In the illustrative embodiment, the process may include adjusting the pH of the milk to 7.5° prior to heating.

The present invention also provides a cheese comprising about 51-53% moisture (depending on acid type), about 20-22% protein, about 19-21% fat and having a pH of about 5.2-5.3.

A more detailed explanation of the invention is provided in the following description and claims.

DETAILED DESCRIPTION OF THE ILLUSTRATIVE EMBODIMENT

The cheese is preferably made from milk containing 3.5 % fat. The pH of the milk may be adjusted to 7.5 in order to reduce the formation of milkstone, film or burn-on on the vat. Anhydrous calcium chloride is added to the milk at the rate of 0.02% (wt./wt.). The calcium chloride is dissolved in a small volume of water before adding to the milk The milk is slowly heated indirectly (by steam injection) in a water-jacketed vat at the rate of about 1.3° C. (2.3° F.) per minute to about 85° C. (185° F.) and held there for about 30 minutes. A 2% solution of food-grade organic acid, preferably acetic, citric, malic or lactic acid or blends thereof, at a temperature of about 79° C. (175° F.) is slowly and uniformly added with mild agitation to reduce the pH of the milk to about 4.4 and to form a curd. The volume of acid required to make this pH adjustment depends on the type of acid and the initial pH of the milk.

The curd-whey mixture is held at 73°-75° C. (165°-167° F.) for about 10 minutes with occasional gentle stirring under quiescent conditions (with the vat covered) to allow the curd to form agglomerates and to settle to the bottom of the vat. The whey is drained through a strainer while the hot water in the jacket of the vat is simultaneously drained. Generally, it took about 15-20 minutes for complete whey drainage. After most of the whey is removed, the curd is trenched to facilitate complete whey removal. The curd is cooled by circulating cold water through the jacket.

Salt (NaCl) is added to the curd at the rate of 2% wt./wt. of curd. The salt is stirred into the curd in three equal applications. At this stage, the curd ceases to expel whey. The salted curd is hooped into stainless steel hoops and pressed for about 30 minutes at 40 psi. After pressing, the hoop is transferred to a freezer at −7° to −10 ° C. (19°-14° C.) for 2 hours such that the curd temperature drops to about 26° C. (80° F.). From the freezer, it is transferred to a cold room at 7°-10° C. (45°-50° F.) where it is held overnight. Then, the cheese is removed from the hoop and vacuum-packaged.

The yield of the cheese is about 13.5% (at 50% moisture basis). The composition of the cheese formed is: moisture, 51-53%; protein, 20-22%; fat, 19-21% and pH, 5.2-5.3. The cheese produced had a mild flavor, excellent sliceability, melt resistant and remained fresh for at least 9 weeks of refrigerated storage.

EXAMPLE I

Eighty-one pounds (36.8 kilograms, kg) of milk (containing 3.5% fat, 3.38% protein, and 12.30% total solids, and having pH 6.7), was weighed into a 30-gallon capacity stainless steel, water-jacketed vat. Calcium chloride (9.57 grams, g) was dissolved in about 20 milliliters (mL) water and stirred into the milk. The jacket was filled with cold water to approximately the same level of milk in the vat. Steam was slowly injected into the jacket to raise the temperature of the milk to 85° C. over one hour. Table 1 illustrates the incremental heating scheme:

TABLE 1

| Heating scheme of milk. | |
| --- | --- |
| Time (min) | Temperature |
| 0.00 | 15.5° C. (60° F.) |
| 10.00 | 32.2° C. (90° F.) |

TABLE 1-continued

| Heating scheme of milk. | |
|---|---|
| Time (min) | Temperature |
| 20.00 | 51.6° C. (125° F.) |
| 30.00 | 65.6° C. (150° F.) |
| 40.00 | 73.8° C. (165° F.) |
| 50.00 | 79.4° C. (175° F.) |
| 60.00 | 85.0° C. (185° F.) |
| 90.00 | 85.0° C. (185° F.) |

The milk was held at 85° C. for 30 minutes. Then, 4.5 liters of a solution of acetic acid (prepared by adding 200 mL of food-grade glacial acetic acid to approximately 10 liters of hot water at about 79.4° C. (175° F.)) were slowly added to the hot milk with mild agitation. The pH of the curd-whey mixture in the vat was 4.4. Visible coagulation of the milk occurred at a pH of about 4.9. The process of acid addition was completed within 10 minutes. The temperature of the curd-whey mixture in the vat at this stage was about 73°-75° C. (165°-167° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. It took about 15 minutes for complete whey drainage. Cold city water was circulated through the jacket to cool the curd. Salt (99.4 g) was then mixed into the curd in three applications (about 33 g per application) at time intervals of about 3-4 minutes between applications. At the initial application of salt, the curd ceased to expel whey. The salted curd was hooped into 10-lb Wilson-style stainless steel hoops and pressed at 40 psi in a horizontal hydraulic press for 30 minutes. The hoop was removed from the press and placed in a freezer at −7° to −10° C. (19°-14° F.) for 2 hours to rapidly cool the curd to about 27° C. (80° F). From the freezer the hoop was placed in a cold room maintained at 7° C. (45° F.) where it was kept overnight. Then the cheese was removed from the hoop, vacuum-packaged and stored at 7° C. for consumption. Table 2 shows the yield and composition of cheese.

TABLE 2

| Composition of Queso Blanco made with acetic acid. | |
|---|---|
| Component | Cheese |
| Moisture | 51.52% |
| Protein | 21.28% |
| Fat | 20.5% |
| Salt | 1.91% |
| pH | 5.32 |
| Yield | 13.58% |

The whey tested 5.68% total solids and 0.27% protein (Kjeldahl nitrogen x 6.38).

EXAMPLE II

Eighty-five pounds (38.6 kg) of 3.5% fat milk, pH 6.7, was weighed into a 30-gallon capacity stainless steel, water-jacketed vat. Calcium chloride (9.92 g) was dissolved in about 20 milliliters water and stirred into the milk. The jacket was filled with cold water to approximately the same level of milk in the vat. Steam was slowly injected into the jacket to raise the temperature of the milk to 85° C. over one hour as illustrated in Table 1.

The milk was held at 85° C. for 30 minutes. Then, 4.5 liters of a 2% solution of citric acid (prepared by adding 200 grams of food-grade citric acid to approximately 10 liters of hot water at about 79.4° C. (175° F.)) were slowly added to the hot milk with mild agitation. The pH of the curd-whey mixture in the vat was 4.4. Visible coagulation of the milk occurred at a pH of about 4.9. The process of acid addition was completed within 10 minutes. The temperature of the curd-whey mixture in the vat at this stage was about 73°-75° C. (165°-167° F.) where it was held for about 10 minutes under quiescent conditions, with the vat covered. Then, the vat was uncovered and a strainer was placed into the drain opening and the valve was opened to drain whey. Simultaneously, the hot water in the jacket was drained. After draining of most of the whey, the curd was trenched for complete whey removal. It took about 15 minutes for complete whey drainage. Cold city water was circulated through the jacket to cool the curd. Salt (104.3 g) was then mixed into the curd in three applications (about 34.7 g per application) at time intervals of about 3-4 minutes between applications. At the initial application of salt, the curd ceased to expel whey. The salted curd was hooped into 10-lb Wilson-style stainless steel hoops and pressed at 40 psi in a horizontal hydraulic press for 30 minutes. The hoop was removed from the press and placed in a freezer at −7° to −10° C. (19°-14° F.) for 2 hours to rapidly cool the curd to about 27° C. (80° F.). From the freezer the hoop was placed in a cold room maintained at 7° C. (45° F.) where it was kept overnight. The cheese was removed from the hoop, vacuum-packaged and stored at 7° C. for consumption. Table 3 shows the composition and yield of the cheese.

TABLE 3

| Composition of Queso Blanco made with citric acid. | |
|---|---|
| Component | Cheese |
| Moisture | 51.21% |
| Protein | 20.44% |
| Fat | 20.0% |
| Salt | 1.88% |
| pH | 5.28 |
| Yield | 13.75% |

The whey contained 5.81% total solids and 0.28% protein (Kjeldahl nitrogen x 6.38).

EXAMPLE III

Eighty-six pounds (39 kg) of 3.5% fat milk, pH 6.7, was weighed into a 30-gallon capacity stainless steel, water-jacketed vat. Calcium chloride (10.16 g) was dissolved in about 20 mL water and stirred into the milk. The jacket was filled with cold water to approximately the same level of milk in the vat. Steam was slowly injected into the jacket to raise the temperature of the milk to 85° C. over one hour as illustrated in Table 1.

The milk was held at 85° C. for 30 minutes. Then, 5.5 liters of a 2% solution of lactic acid (prepared by adding 230 mL of 85% food-grade lactic acid to approximately 10 liters of hot water at about 79.4° C. (175° F.)) were slowly added to the hot milk with mild agitation. The pH of the curd-whey mixture in the vat was 4.4. Visible coagulation of the milk occurred at a pH of about 4.9. The process of acid addition was completed within 10 minutes. The temperature of the curd-whey mixture in the vat at this stage was about 73°-75 ° C. (165°-167° F.)

where it was held for about 10 minutes under quiescent conditions, with the vat covered. Then, the vat was uncovered and a strainer was placed into the drain opening, and the valve was opened to drain whey. Simultaneously the hot water in the jacket was drained. After draining of most of the whey, the curd was trenched for complete whey removal. It took about 20 minutes for complete whey drainage. Cold city water was circulated through the jacket to cool the curd. Salt (105.5 g) was then mixed into the curd in three applications (about 35.1 g per application) at time intervals of about 3-4 minutes between applications. At the initial application of salt, the curd ceased to expel whey. The salted curd was hooped into 10-lb Wilson-style stainless steel hoops and pressed at 40 psi in a horizontal hydraulic press for 30 minutes. The hoop was removed from the press and placed in a freezer at −7° to −10° C. (19°–14° F.) for 2 hours to rapidly cool the curd to about 27° C. (80° F.). From the freezer the hoop was placed in a cold room maintained at 7° C. (45° F.) where it was kept overnight. Then the cheese was removed from the hoop, vacuum-packaged and stored at 7° C. for consumption. Table 4 shows the composition and yield of the cheese.

TABLE 4

| Composition of Queso Blanco made with lactic acid. | |
| --- | --- |
| Component | Cheese |
| Moisture | 53.77% |
| Protein | 19.70% |
| Fat | 18.5% |
| Salt | 1.81% |
| pH | 5.28 |
| Yield | 14.0% |

The whey contained 6.36% total solids and 0.31% protein (Kjeldahl nitrogen x. 6.38).

EXAMPLE IV

The pH of 137 pounds (62.2 kg) of 3.5% fat milk was adjusted to 7.5 by stirring in about 66 mL of 25% NaOH. The alkalinized milk was held overnight at 4° C. Then the milk was transferred into a 30-gallon capacity stainless steel, water-jacketed vat. Calcium chloride (16.2 g) was dissolved in about 50 mL water and stirred into the milk. The jacket was filled with cold water to approximately the same level of milk in the vat. Steam was slowly injected into the jacket to raise the temperature of the milk to 85° C. over one hour as illustrated in Table 1.

The milk was held at 85° C. for 30 minutes. Then, 8.6 liters of a 2% solution of citric acid (prepared by adding 200 g of food-grade citric acid to approximately 10 liters of hot water at about 79.4° C. (175° F.)) were slowly added to the hot milk with mild agitation. The pH of the curd-whey mixture in the vat was 4.4. Visible coagulation of the milk occurred at a pH of about 4.9. The process of acid addition was completed within 10 minutes. The temperature of the curd-whey mixture in the vat at this stage was about 73°–75° C. (165°–167° F.) where it was held for about 10 minutes under quiescent conditions with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. It took about 20 minutes for complete whey drainage. Cold city water was circulated through the jacket to cool the curd. Salt (161 g) was then mixed into the curd in three applications about 53 g per application) at time intervals of about 3-4 minutes between applications. At the initial application of salt, the curd ceased to expel whey. The salted curd was hooped into 20-lb Wilson-style stainless steel hoops and pressed at 40 psi in a horizontal hydraulic press for 30 minutes. The hoop was removed from the press and placed in a freezer at −7° to −10° C. (19°–14° F.) for 2 hours to rapidly cool the curd to about 27° C. (80° F.). From the freezer the hoop was placed in a cold room maintained at 7° C. (45° F.) where it was kept overnight. Then the cheese was removed from the hoop, vacuum-packaged and stored at 7° C. for consumption. Table 5 shows the composition and yield of the cheese.

TABLE 5

| Composition of Queso Blanco made with citric acid. | |
| --- | --- |
| Component | Cheese |
| Moisture | 52.58% |
| Protein | 23.00% |
| Fat | 20.0% |
| Salt | 2.0% |
| pH | 5.21 |
| Yield | 12.84% |

EXAMPLE V

The pH of 106 pounds (48.12 kg) of 3.5% fat milk was adjusted to 7.5 by stirring in about 54 mL of 25% NaOH. The alkalinized milk was held overnight at 4° C. Then the milk was transferred into a 30-gallon capacity stainless steel, water-jacketed vat. Calcium chloride (12.5 g) was dissolved in about 40 mL water and stirred into the milk. The jacket was filled with cold water to approximately the same level of milk in the vat. Steam was slowly injected into the jacket to raise the temperature of the milk to 85° C. over one hour as illustrated in Table 1.

The milk was held at 85° C. for 30 minutes. Then, 8.5 liters of a 2% solution of malic acid (prepared by adding 200 g of food-grade malic acid to approximately 10 liters of hot water at about 79.4%° C. (175° F.)) were slowly added to the hot milk with mild agitation. The pH of the curd-whey mixture in the vat was 4.4. Visible coagulation of the milk occurred at pH of about 4.9. The process of acid addition was completed with 10 minutes. The temperature of the curd-whey mixture in the vat at this stage was about 73°–75° C. (165°–167° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. It took about 20 minutes for complete whey drainage. Cold city water was circulated through the jacket to cool the curd. Salt (125.2 g) was then mixed into the curd in three applications (about 41.7 g per application) at time intervals of about 3-4 minutes between applications. At the initial application of salt, the curd ceased to expel whey. The salted curd was hooped into 20-lb Wilson-style stainless steel hoops and pressed at 40 psi in a horizontal hydraulic press for 30 minutes. The hoop was removed from the press and placed in a freezer at −7° to −10° C. (19°–14° F.) for 2 hours to rapidly cool the curd to about 27° C. (80° F.). From the freezer the hoop was placed in a cold room maintained at 7° C. (45 ° F.) where it was kept overnight. Then the cheese was removed from the hoop, vacuum-packaged and stored at 7° C. for consumption. Table 6 shows the composition and yield of the cheese.

TABLE 6

Composition of Queso Blanco made with malic acid.

| Component | Cheese |
|---|---|
| Moisture | 49.56% |
| Protein | 21.76% |
| Fat | 20.5% |
| Salt | 1.96% |
| pH | 5.21 |
| Yield | 13.69 |

EXAMPLE VI

Two hundred and twenty-seven pounds (103.3 kg) of 3.5% fat milk, pH 6.7, was weighed into a 100-gallon capacity stainless steel, water-jacketed vat. Calcium chloride (26.8 g) was dissolved in about 50 mL water and stirred into the milk. The jacket was filled with cold water to approximately the same level of milk in the vat. Steam was slowly injected into the jacket to raise the temperature of the milk to 85° C. over one hour as illustrated in Table 1.

The milk was held at 85° C. for 30 minutes. Then, 9.75 liters of a 2% solution of equal quantities of malic and acetic acid (prepared by adding 100 g of food-grade malic acid plus 100 mL food-grade glacial acetic acid to approximately 100 liters of hot water at about 79.4° C. (175° F.)) were slowly added to the hot milk with mild agitation. The pH of the curd-whey mixture in the vat was 4.4. Visible coagulation of the milk occurred at pH of about 4.9. The process of acid addition was completed within 10 minutes. The temperature of the curd-whey mixture in the vat at this stage was about 73°–75° C. (165°–167° F.) where it was held for about 10 minutes under quiescent conditions, with the vat covered. Then, the vat was uncovered and a strainer was placed into the drain opening, and the valve was opened to drain whey. Simultaneously, the hot water in the jacket was drained. After draining of most of the whey, the curd was trenched for complete whey removal. It took about 15 minutes for complete whey drainage. Cold city water was circulated through the jacket to cool the curd. Salt (278 g) was then mixed into the curd in three applications (about 93 g per application) at time intervals of about 3–4 minutes between applications. At the initial application of salt, the curd ceased to expel whey. The salted curd was hooped into 10-lb Wilson-style stainless steel hoops and pressed at 40 psi in a horizontal hydraulic press for 30 minutes. The hoops were removed from the press and placed in a freezer at −7° to −10° C. (19°–14° F.) for 2 hours to rapidly cool the curd to about 27° C. (80° F.). From the freezer the hoop was placed in a cold room maintained at 7° C. (45° F.) where it was kept overnight. The cheese was removed from the hoops, vacuum-packaged and stored at 7° C. for consumption. Table 7 shows the composition and yield of the cheese.

TABLE 7

Composition of Queso Blanco made with malic/acetic acid blend.

| Component | Cheese |
|---|---|
| Moisture | 51.85% |
| Protein | 21.86% |
| Fat | 21.0% |
| Salt | 1.98% |
| pH | 5.30 |
| Yield | 13.60 |

The whey contained 5.64% total solids

Although illustrative embodiments of the invention have been described, however, it is to be understood that various modifications and substitutions may be made by those skilled in the art without departing from the novel spirit and scope of the present invention.

What is claimed is:

1. A process for making cheese comprising:
   adding calcium chloride to milk;
   heating the milk slowly to about 85° C.;
   holding the milk at 85° C. for about 30 minutes;
   adding food-grade organic at a temperature of about 79° C. to the heated milk at about 85° C. to reduce the pH of said milk to about 4.4 to form a curd and whey;
   removing the whey; and
   cooling the curd rapidly to about 8° C.

2. The process of claim 1 further comprising adjusting the pH of the milk to about 7.5 prior to heating it.

3. The process of claim 1 further wherein said heating step comprises heating the milk at the rate of about 1.3° C. per minute to about 85° C.

4. The process of claim 1 wherein said food-grade organic acid is selected from the group consisting of acetic acid, citric acid, malic acid, lactic acids and blends thereof.

5. A process for making cheese comprising:
   adjusting the pH of milk to 7.5;
   adding calcium chloride to the milk;
   heating the milk slowly to about 85° C.;
   holding the milk at 85° C. for about 30 minutes;
   adding food-grade organic acid at a temperature of about 79° C. to the heated milk at about 85° C. to reduce the pH of said milk to about 4.4 to form a curd and whey mixture;
   hold the curd-whey mixture at about 73°–75° C. for about 10 minutes under quiescent conditions;
   removing the whey;
   salting the curd;
   hooping and pressing the curd; and
   cooling the curd rapidly to about 8° C.

* * * * *